US012308155B2

(12) United States Patent
Park et al.

(10) Patent No.: US 12,308,155 B2
(45) Date of Patent: May 20, 2025

(54) COIL ELECTRONIC COMPONENT

(71) Applicant: SAMSUNG ELECTRO-MECHANICS CO., LTD., Suwon-si (KR)

(72) Inventors: Joong Won Park, Suwon-si (KR); Il Jin Park, Suwon-si (KR); Se Hyung Lee, Suwon-si (KR); Jun Sung Lee, Suwon-si (KR); Seok Hee Lee, Suwon-si (KR); Ji Hwan Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1059 days.

(21) Appl. No.: 17/241,351

(22) Filed: Apr. 27, 2021

(65) Prior Publication Data

US 2022/0189676 A1 Jun. 16, 2022

(30) Foreign Application Priority Data

Dec. 11, 2020 (KR) ........................ 10-2020-0173525

(51) Int. Cl.
*H01F 27/25* (2006.01)
*H01F 17/00* (2006.01)
*H01F 27/255* (2006.01)
*H01F 27/29* (2006.01)

(52) U.S. Cl.
CPC ....... *H01F 27/255* (2013.01); *H01F 17/0013* (2013.01); *H01F 27/292* (2013.01)

(58) Field of Classification Search
CPC ... H01F 27/255; H01F 17/0013; H01F 27/292
See application file for complete search history.

(56) References Cited

U.S. PATENT DOCUMENTS

| | | | | |
|---|---|---|---|---|
| 2019/0279801 | A1* | 9/2019 | Yoshidome | H01F 1/26 |
| 2019/0279802 | A1* | 9/2019 | Yoshidome | H01F 1/33 |
| 2019/0392978 | A1 | 12/2019 | Matsuura | |
| 2020/0051720 | A1* | 2/2020 | Li | H01F 41/0246 |
| 2020/0066436 | A1 | 2/2020 | Kim et al. | |

(Continued)

FOREIGN PATENT DOCUMENTS

| | | | | |
|---|---|---|---|---|
| CN | 108269672 A * | 7/2018 | | H01F 1/24 |
| JP | 4037989 B2 | 11/2007 | | |

(Continued)

OTHER PUBLICATIONS

Office Action dated Dec. 4, 2024, issued in corresponding Korean Patent Application No. 10-2020-0173525 with an English translation.

*Primary Examiner* — Malcolm Barnes
(74) *Attorney, Agent, or Firm* — Morgan Lewis & Bockius LLP

(57) ABSTRACT

A coil electronic component includes a body including a coil portion therein, and including a plurality of magnetic particles including an Fe-based alloy component, and an external electrode connected to the coil portion, wherein at least a portion of the plurality of magnetic particles include a first layer formed on a surface, and a second layer formed on a surface of the first layer, wherein the first layer includes an Fe oxide component and has a thickness of 10 nm or less.

20 Claims, 4 Drawing Sheets

(56) References Cited

U.S. PATENT DOCUMENTS

| | | | | |
|---|---|---|---|---|
| 2020/0203062 | A1 | 6/2020 | Lee et al. | |
| 2021/0027940 | A1* | 1/2021 | Tadai | H01F 27/2823 |
| 2021/0193362 | A1* | 6/2021 | Tsuchiya | H01F 1/26 |
| 2021/0304946 | A1* | 9/2021 | Ishida | H01F 1/33 |
| 2021/0350962 | A1* | 11/2021 | Hanada | H01F 1/22 |
| 2022/0102038 | A1* | 3/2022 | Nagai | H01F 17/0013 |

FOREIGN PATENT DOCUMENTS

| | | | |
|---|---|---|---|
| KR | 10-2019-0106791 | A | 9/2019 |
| KR | 10-2019-0143804 | A | 12/2019 |
| KR | 10-2020-0022305 | A | 3/2020 |
| KR | 10-2020-0077136 | A | 6/2020 |

* cited by examiner

COIL ELECTRONIC COMPONENT

CROSS-REFERENCE TO RELATED APPLICATION(S)

This application claims benefit of priority to Korean Patent Application No. 10-2020-0173525 filed on Dec. 11, 2020 in the Korean Intellectual Property Office, the disclosure of which is incorporated herein by reference in its entirety.

BACKGROUND

The present disclosure relates to a coil electronic component.

With the miniaturization and thinning of electronic devices such as digital TVs, mobile phones, notebooks, or the like, coil electronic components applied to such electronic devices are also required to be miniaturized and thinned, and research and development into various types of winding type or thin film type coil electronic components are being actively conducted.

The main issue according to the miniaturization and thinning of coil electronic components is to implement the same characteristics as those of existing coil electronic components despite miniaturization and thinning. In order to satisfy this requirement, a ratio of the magnetic material in a core filled with the magnetic material must be increased, but there is a limitation in increasing the ratio due to the strength of an inductor body and a change in frequency characteristics according to insulation.

As an example of manufacturing a coil electronic component, a method of forming a body by laminating a sheet in which magnetic particles and a resin, or the like, are mixed on a coil and then pressing the same may be used, and ferrite or metal may be used as such magnetic particles. When magnetic metal particles are used, it is advantageous to increase the content of the particles in terms of the magnetic permeability characteristics of the coil electronic component, but in this case, the insulation of the body may be deteriorated, resulting in eddy current loss occurring. When the insulating layer is coated on the surface of the magnetic metal particles, a proportion occupied by the magnetic metal particles in the body may decrease, which may be disadvantageous for the magnetic properties.

SUMMARY

An aspect of the present disclosure is to provide a coil electronic component capable of improving magnetic properties such as permeability and a saturation magnetic flux value by implementing a thin surface insulating layer of magnetic metal particles.

According to an aspect of the present disclosure, a coil electronic component, includes a body including a coil portion therein, and including a plurality of magnetic particles including an Fe-based alloy component, and an external electrode connected to the coil portion, wherein at least a portion of the plurality of magnetic particles include a first layer formed on a surface, and a second layer formed on a surface of the first layer, wherein the first layer includes an Fe oxide component and has a thickness of 10 nm or less.

In some embodiments, a thickness of the second layer may be 5 to 10 times the thickness of the first layer.

In some embodiments, a sum of the thicknesses of the first layer and the second layer may be 50 to 100 nm.

In some embodiments, a thickness of the first layer may be 5 to 10 nm.

In some embodiments, the first layer may be formed directly on a surface of the magnetic particles.

In some embodiments, the Fe oxide may include at least one of an Fe—O-based material or an Fe—Si—O-based material.

In some embodiments, the Fe-based alloy may include an Fe—Si—B—C-based material.

In some embodiments, the Fe-based alloy may not include Cr, Mo, Nb, and P components.

In some embodiments, a content of Fe in the Fe-based alloy may exceed 90 wt % with respect to a total content of the Fe-based alloy.

In an embodiment, a content of Si in the Fe-based alloy may be 0.1 to 5 wt % with respect to a total content of the Fe-based alloy.

In some embodiments, a content of B in the Fe-based alloy may be 0.1 to 5 wt % with respect to a total content of the Fe-based alloy.

In some embodiments, a content of C in the Fe-based alloy may be 0.1 to 2 wt % with respect to a total content of the Fe-based alloy.

In some embodiments, the second layer may be an oxide layer including a phosphorus (P) component.

In some embodiments, the second layer may include an Fe—P—O-based material.

In some embodiments, the content of the Fe component present in the first layer may be higher than the content of the Fe component present in the second layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
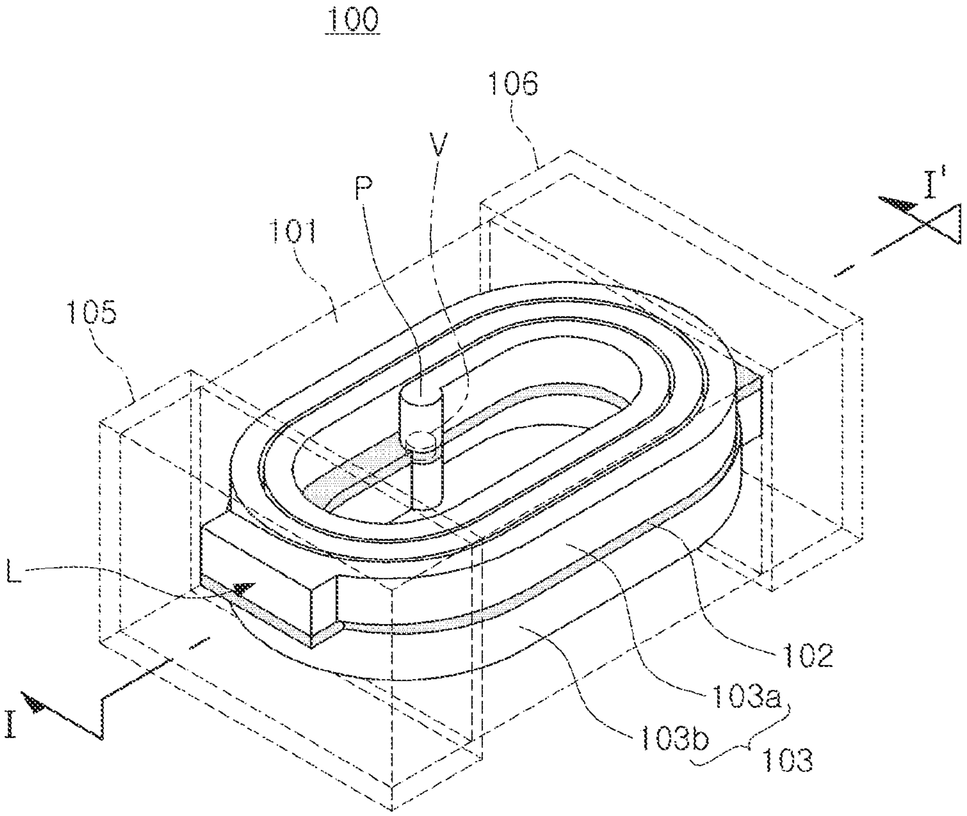
FIG. 1 is a schematic perspective diagram illustrating a coil electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be through and complete, and will fully convey the scope of the disclosure to those skilled in the art. Accordingly, shapes and sizes of elements in the drawings may be exaggerated for clarity of description, and elements indicated by the same reference numeral are same elements in the drawings.

Figure 2:
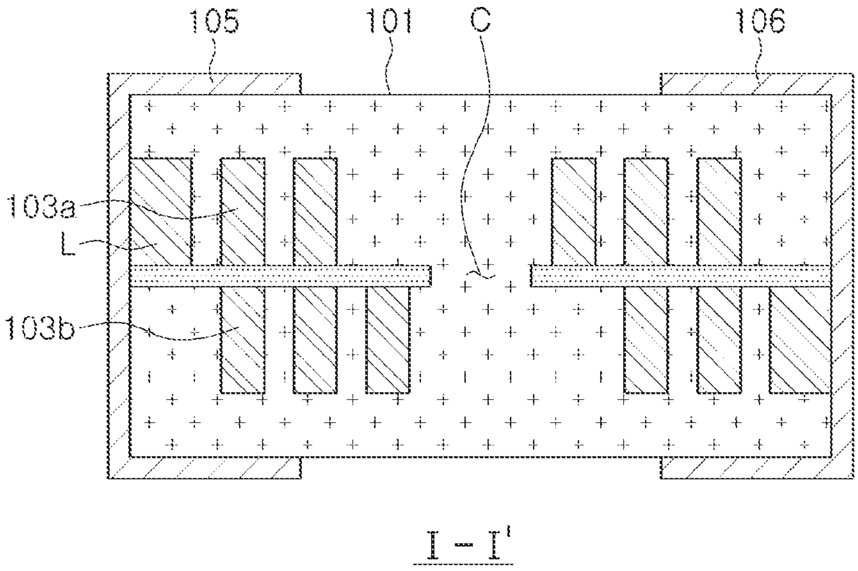
FIG. 2 is a schematic cross-sectional diagram taken along line I-I' of the coil electronic component of FIG. 1.
Figure 3:
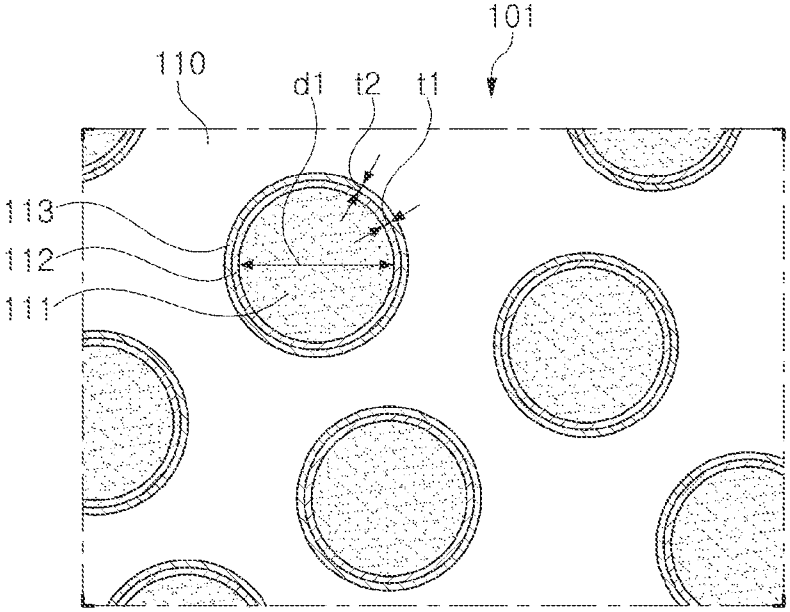
FIG. 3 is an enlarged diagram of a region of a body in the coil electronic component of FIG. 1.
Figure 4:
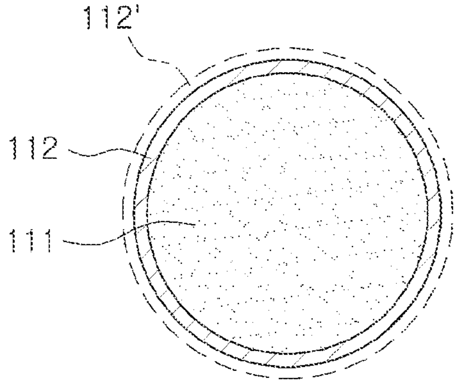
FIG. 4 illustrates an aspect of reducing a thickness of a surface insulating layer in magnetic particles.

FIG. 1 is a schematic perspective diagram illustrating a coil electronic component according to an embodiment of the present disclosure. FIG. 2 is a schematic cross-sectional diagram taken along the line I-I' of the coil electronic component of FIG. 1. FIG. 3 is an enlarged diagram of one region of a body in the coil electronic component of FIG. 1. FIG. 4 illustrates an aspect of reducing a thickness of a surface insulating layer in magnetic particles.

Referring to FIGS. 1 to 3, a coil electronic component 100 according to an embodiment of the present disclosure may include a body 101, a support substrate 102, a coil pattern 103, and external electrodes 105 and 106, and the body 101 may include a plurality of magnetic particles 111. Here, at least a portion of particles of the plurality of magnetic particles 111 include a first layer 112 and a second layer 113, and the first layer 112 includes an Fe oxide component and has a thickness t1 of 10 nm or less.

The body 101 may seal at least a portion of the support substrate 102 and the coil pattern 103 to form an exterior of the coil electronic component 100. In addition, the body 101 may be formed so that a partial region of a lead-out pattern L is exposed externally. As shown in FIG. 3, the body 101 may include a plurality of magnetic particles 111, and these magnetic particles 111 may be dispersed within an insulating material 110. The insulating material 110 may include a polymer component such as an epoxy resin and polyimide.

The body 101 includes a plurality of magnetic particles 111 including an Fe-based alloy component in a core portion of the magnetic particles. When the magnetic particles 111 are implemented with an Fe-based alloy, magnetic properties such as a magnetization saturation value may be excellent, but for the purpose of reducing eddy current loss, at least a portion of the magnetic particles 111 include a first layer 112 formed on a surface thereof, and a second layer 113 formed on a surface of the first layer 112. The plurality of magnetic particles 111 may have a diameter d1 of about 10 to 25 μm. In the case of the present embodiment, the plurality of magnetic particles 111 may include an Fe—Si—B—C-based material. More specifically, the Fe-based alloy may not include Cr, Mo, Nb, and P components. These elements are components for reinforcing corrosion resistance by slowing a corrosion process of the magnetic particles 111. However, when the content of these elements is increased, the content of Fe is relatively decreased, so that the magnetization saturation value of the magnetic particles 111 may decrease. In the present embodiment, the magnetization saturation property may be sufficiently secured by using an Fe-based alloy including a relatively large amount of Fe. Even in this case, by forming the first layer 112 corresponding to a surface oxide layer to be thin, the magnetic particles 111 may have a sufficient volume fraction in the body 101. The magnetic particles 111 and the insulating structure (first layer and second layers) will be described in more detail later.

Related to an example of a manufacturing method thereof, the body 101 may be formed by a lamination method. Specifically, after the coil portion 103 is formed on the support substrate 102 by using a method such as plating, or the like, a plurality of unit laminates for manufacturing the body 101 may be prepared and laminated. Here, a slurry may be prepared by mixing magnetic particles 111 such as a metal, or the like, and a thermosetting resin and organic substances such as a binder, a solvent, and the like, and the slurry may be applied to a carrier film by a doctor blade method to a thickness of several tens of micrometers and then dried to prepare the unit laminate as a sheet type. Accordingly, the unit laminates may be manufactured in a form in which magnetic particles are dispersed in a thermosetting resin such as an epoxy resin or polyimide. The magnetic particles 111 may have the shape described above, and a first layer 112 and a second layer 113 are formed on a surface thereof. The body 101 may be implemented by forming the plurality of the unit laminates described above and laminating the unit laminates under pressure in the upper and lower portions of the coil portion 103.

The support substrate 102 may support the coil portion 103, and may be formed of a polypropylene glycol (PPG) substrate, a ferrite substrate, a metallic soft magnetic substrate, or the like. As shown in the drawings, a through-hole may be formed in a central portion of the support substrate 102, and the body 101 may be filled in the through-hole to form a magnetic core portion C.

The coil portion 13 is included in the body 101 therein and serves to perform various functions in the electronic device through characteristics exhibited from the coil of the coil electronic component 100. For example, the coil electronic component 100 may be a power inductor, and in this case, the coil portion 103 may serve to stabilize power supply by maintaining an output voltage by storing electricity in a form of a magnetic field. In this case, a coil pattern forming the coil portion 103 may be laminated on both surfaces of the support substrate 102, and may be electrically connected through a conductive via V penetrating through the support substrate 102. The coil portion 103 may be formed in a spiral shape, and may include a lead-out portion L exposed externally of the body 101 at an outermost of the spiral shape, for electrical connection with the external electrodes 105 and 106.

The coil portion 103 is disposed on at least one of a first surface (an upper surface with reference to FIG. 2) and a second surface (a lower surface with reference to FIG. 2) opposing each other in the support substrate 102. As in the present embodiment, the coil portion 103 may be disposed on both the first and second surfaces of the support substrate 102, and in this case, the coil portion 103 may include a pad region P. However, unlike this, the coil portion 103 may be disposed only on one surface of the support substrate 102. Meanwhile, in the case of the coil pattern forming the coil portion 103, it may be formed using a plating process used in the art, for example, using a method such as pattern plating, anisotropic plating, isotropic plating, or the like, and may be formed in a multi-layered structure using a plurality of processes among these processes.

External electrodes 105 and 106 may be formed externally of the body 101 to be connected to a lead-out portion L. The external electrodes 105 and 106 may be formed by using a paste containing metal having excellent electrical conductivity, and for example, may be a conductive paste containing nickel (Ni), copper (Cu), tin (Sn), or silver (Ag), or an alloy thereof. In addition, a plating layer (not shown) may be further formed on the external electrodes 105 and 106. In this case, the plating layer may include any one or more selected from a group consisting of nickel (Ni), copper (Cu), and tin (Sn). For example, a nickel (Ni) layer and a tin (Sn) layer may be sequentially formed as the plating layer on the external electrodes 105 and 106.

When the plurality of magnetic particles 111 included in the body 101 are described in more detail, a content of Fe in the Fe-based alloy included in the magnetic particles 111 may exceed a relatively large amount, for example, 90 wt % with respect to a total content of the Fe-based alloy. As the content of Fe increases in the Fe-based alloy, any one of Cr, Mo, Nb, and P may not be added, and all of these components may not be added. Referring to a more specific composition condition as an example, a content of Si in the Fe-based alloy may be 0.1 to 5 wt %. In addition, a content of B in the Fe-based alloy may be 0.1 to 5 wt %. In addition, a content of C in the Fe-based alloy may be 0.1 to 2 wt %.

As described above, in the case of the magnetic particles 111 having enhanced magnetization saturation characteristics, the Fe-based alloy included therein may not contain a corrosion resistance enhancing element, but a thick oxide film may be formed on the surface due to a decrease in corrosion resistance. The oxide film may correspond to a surface oxide film or a natural oxide film in which the surface of the magnetic particles 111 is oxidized, and since the structure thereof is not dense, moisture and oxygen may continue to penetrate. When the oxide film is thickened, a volume fraction of the magnetic particles 111 in the body 101 decreases, and accordingly, the magnetic properties of the body 101, such as permeability characteristics, may decrease. In the present embodiment, by reducing the thickness t1 of the first layer 112 corresponding to a surface oxide layer to a level of about 10 nm or less, a ratio occupied by the oxide layer in the magnetic particles 111 may be reduced, thereby minimizing deterioration of the magnetic permeability characteristics of the magnetic particles 111. The first layer 112 may be formed by oxidizing the surface of the magnetic particles 111, and accordingly, may be formed directly on the surface of the magnetic particles 111. In this case, the thickness t1 of the first layer 112 may be defined as a distance from the surface of the magnetic particles 111 to the surface of the first layer 112, where the thickness t1 may correspond to an average thickness. A method of measurement of the thickness t1 of the first layer 112 includes, but not limited to, the method of the TEM-EDS analysis as described herewith. The first layer 112 may include at least one of an Fe—O-based material or an Fe—Si—O-based material. For example, the first layer 112 may include $Fe_2O_3$. In addition, the first layer 112 may be formed in an amorphous structure, and accordingly, when analyzing the presence or absence of the first layer 112, the first layer 112 may be chemically analyzed by the composition rather than structurally analyzed.

As shown in FIG. 4, the first layer 112 may be initially formed as a thick layer 112' on the surface of the magnetic particles 111 and then the thickness thereof may be reduced by a separate etching process. As described above, the surface oxide film of the thick film layer 112' may be formed to be thicker (for example, about 20 nm or more) when a corrosion-resistant element is not added to the Fe-based alloy, which adversely affects the magnetic properties of the coil electronic component 100. In the present embodiment, the thickness t1 of the first layer 112 may be made to be 10 nm or less on average by reducing the thickness by etching the thick film layer 112'. In this case, the thickness t1 of the first layer 112 may be about 5 to about 10 nm, and if the thickness is reduced to less than 5 nm, there may be a risk that the insulating properties of the first layer 112 are reduced and may be etched to the magnetic particles 111.

The second layer 113 of the multi-layer insulating structure of the present embodiment may be provided to secure more stable insulating properties, and may be formed to be thicker than the first layer 112. For example, the thickness t2 of the second layer 113 may be 5 to 10 times the thickness t1 of the first layer 112. In addition, a sum of the thicknesses (t1+t2) of the first layer 112 and the second layer 113 may be about 50 to about 100 nm. A method of measurement of the thickness t2 of the second layer 113 includes, but not limited to, the method of the TEM-EDS analysis as described herewith. Other methods of measurement of the thickness of the second layer 113 includes method, which is appreciated by the one skilled in the art. The second layer 113 may be an oxide layer including a phosphorus (P) component, for example, may be P-based glass. The P-based oxide layer included in the second layer 113 may include components such as P, Fe, Zn, and Si, and may include an oxide of these components. For example, the second layer 113 may include an Fe—P—O-based material. In this case, a content of the Fe component present in the first layer 112 may be greater than a content of the Fe component present in the second layer 113. As the first layer 112, the second layer 113 may have an amorphous structure.

Figure 5:
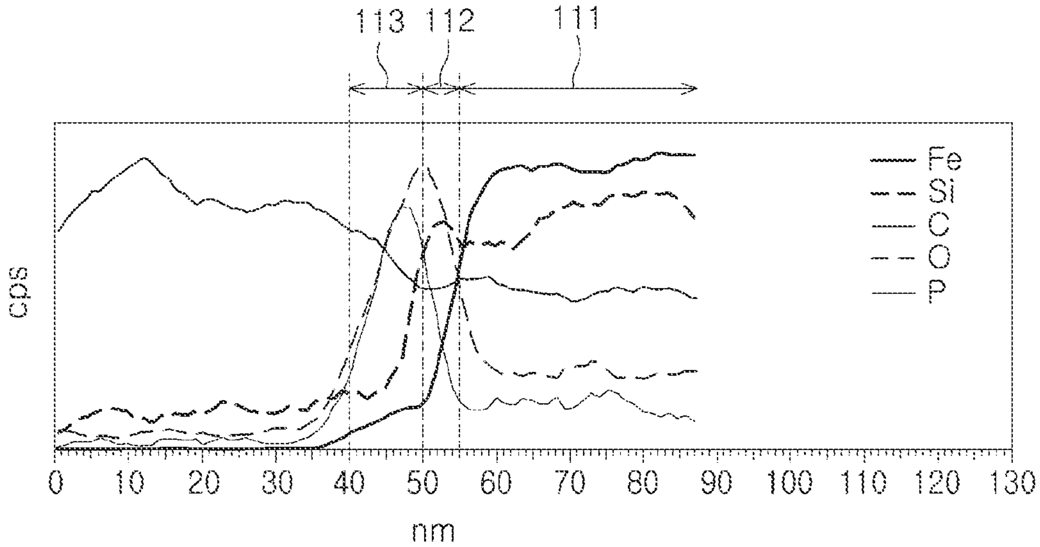
FIG. 5 is a graph of Transmission Electron Microscopy-Energy-Dispersive X-ray Spectroscopy (TEM-EDS) analysis of magnetic particles and insulating structures.

FIG. 5 illustrates a TEM-EDS analysis graph of magnetic particles and insulating structures (first and second layers). For the TEM-EDS analysis, by the inventors of the present disclosure, a sample of the coil electronic component to be measured was polished, and then a cross-section of the body was observed with an SEM. From this, a position of particles having a size of a certain level (for example, a diameter of 5 um or more) was confirmed. In order to observe a cross-section of the particles, a sample near the surface of the particles was taken with a focused ion beam (FIB) to observe a cross-section of powder, and the magnetic particles and the insulating structures of the surface were observed under the conditions of STEM magnification ×110K or higher and acceleration voltage 200 kV. From this, an EDS line profile scan was performed from the vicinity of the surface of the magnetic particles to the insulating structures (first and second layers), and FIG. 5 illustrates the results thereof. As can be seen from the graph shown in FIG. 5, a first layer 112 having a thickness of about 5 nm is formed on the surface of the magnetic particles 111, which may be defined as a region from a portion where a Fe component rapidly decreases to a portion where a P component rapidly increases. The second layer 113 may be defined as a region from a portion where the P component rapidly increases to a portion where an increase in the C component is slowed.

Figure 6:
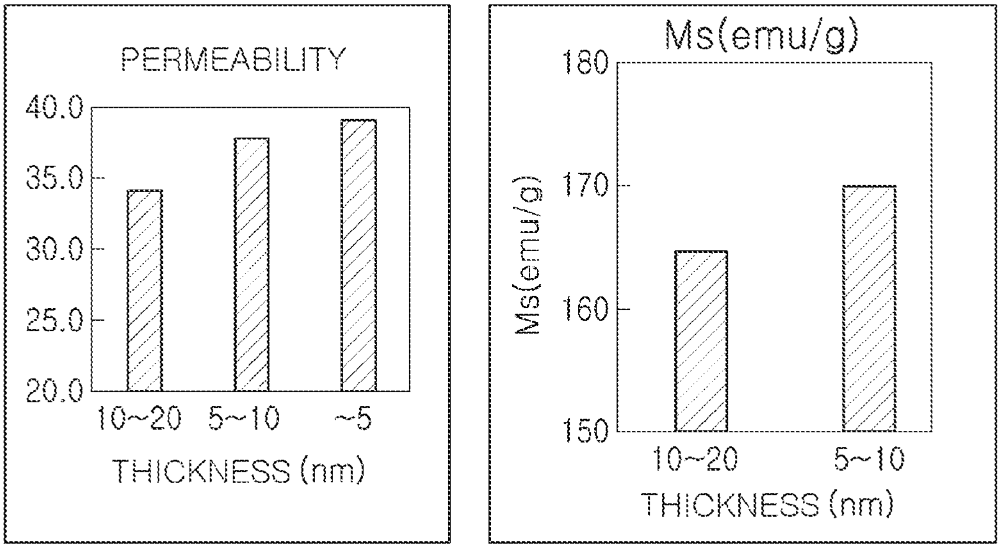
FIG. 6 illustrates the results of measuring magnetic properties, that is, permeability, Ms (a magnetization saturation value) while controlling the thickness of the first layer on the surface of the magnetic particles.

FIG. 6 shows the results of measuring magnetic properties, that is, permeability, Ms (a magnetization saturation value) while controlling the thickness of the first layer on the surface of the magnetic particles. According to the experimental results, as in the present embodiment, when the thickness of the first layer is adjusted to 10 nm or less, the permeability was improved by about 10% and the saturation magnetization value (Ms) was improved by about 3%, compared to the case in which the thickness of the first layer is 10 to 20 nm. In particular, in the case of permeability, it was confirmed that Cr, which has a similar particle size distribution and is a corrosion resistance enhancing element, is improved to a level, similar to that of the added magnetic particles.

Figure 7:
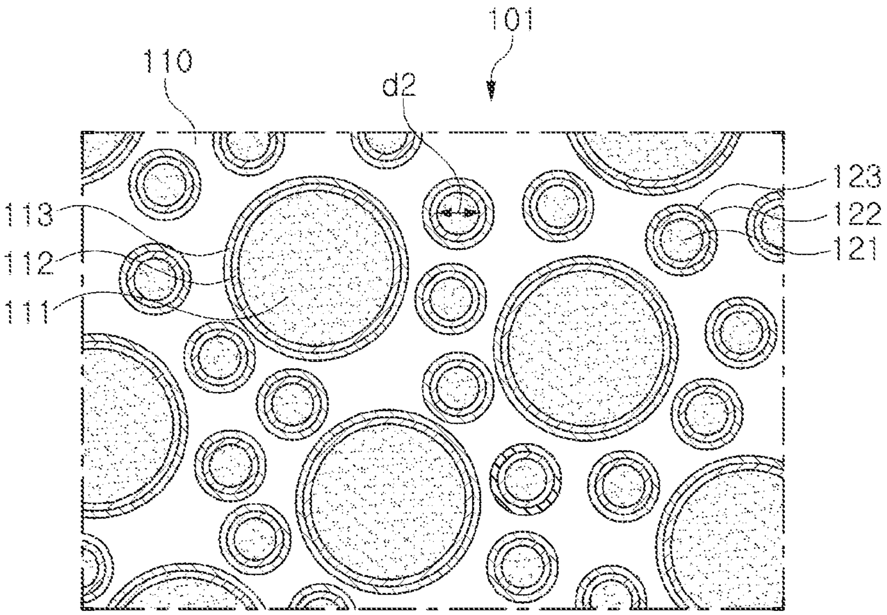
FIG. 7 is an enlarged diagram of a region of a body of a coil electronic component according to a modified example.

Meanwhile, FIG. 7 shows a modified embodiment. In the case of the embodiment of FIG. 7, particles having different particle size distributions are disposed in the body 101. Specifically, the plurality of magnetic particles includes a plurality of first particles 111 and a plurality of second particles 121 having a size, smaller than the first particles 111. In this case, the first particles 111 are the same as those of the particles 111 described in the embodiment of FIG. 3, and may include an Fe-based alloy. In addition, the first particles 111 having various particle size distributions may be employed rather than having one type of particle size distribution. The second particles 121 having a size, smaller than the first particles 111, may fill a space between the first particles 111 to increase the total amount of the magnetic particles 111 and 121 present in the body 101. The second particles 121 may be made of pure iron, for example, may be in a form of carbonyl iron powder (CIP). In addition, a diameter d2 of the second particle 121 may be 5 μm or less.

As set forth above, in the case of the coil electronic component according to an example of the present disclosure, it may have excellent magnetic properties, such as a high level of permeability and saturation magnetic flux characteristics.

While the exemplary embodiments have been shown and described above, it will be apparent to those skilled in the art that modifications and variations could be made without departing from the scope of the present invention as defined by the appended claims.

What is claimed is:

1. A coil electronic component, comprising:

a body including a coil portion therein, and including a plurality of magnetic particles including an Fe-based alloy component; and an external electrode connected to the coil portion, wherein at least a portion of the plurality of magnetic particles comprises a first layer disposed on a surface of the magnetic particles, and a second layer disposed on a surface of the first layer, wherein the first layer comprises an Fe oxide component and has a thickness of 10 nm or less, and wherein a content of Fe in the Fe-based alloy exceeds 90 wt % with respect to a total content of the Fe-based alloy.

2. The coil electronic component of claim 1, wherein a thickness of the second layer is 5 to 10 times the thickness of the first layer.

3. The coil electronic component of claim 1, wherein a sum of the thicknesses of the first layer and the second layer is 50 to 100 nm.

4. The coil electronic component of claim 1, wherein the thickness of the first layer is 5 to 10 nm.

5. The coil electronic component of claim 1, wherein the first layer is disposed directly on the surface of the magnetic particles.

6. The coil electronic component of claim 1, wherein the Fe oxide comprises at least one of an Fe—O-based material or an Fe—Si—O-based material.

7. The coil electronic component of claim 1, wherein the Fe-based alloy comprises a Fe—Si—B—C-based material.

8. The coil electronic component of claim 7, wherein the Fe-based alloy does not comprise Cr, Mo, Nb and P components.

9. The coil electronic component of claim 1, wherein a content of Si in the Fe-based alloy is 0.1 to 5 wt % with respect to a total content of the Fe-based alloy.

10. The coil electronic component of claim 1, wherein a content of B in the Fe-based alloy is 0.1 to 5 wt % with respect to a total content of the Fe-based alloy.

11. The coil electronic component of claim 1, wherein a content of C in the Fe-based alloy is 0.1 to 2 wt % with respect to a total content of the Fe-based alloy.

12. The coil electronic component of claim 1, wherein the second layer is an oxide layer including a phosphorus (P) component.

13. The coil electronic component of claim 12, wherein the second layer comprises an Fe—P—O-based material.

14. The coil electronic component of claim 13, wherein a content of the Fe component present in the first layer is higher than a content of the Fe component present in the second layer.

15. The coil electronic component of claim 1, wherein the plurality of magnetic particles has a diameter of 10 to 25 μm.

16. The coil electronic component of claim 1, wherein the second layer includes an oxide of P, Fe, Zn, or Si.

17. A coil electronic component, comprising:

a body including a coil portion therein, and including a plurality of magnetic particles including an Fe-based alloy component; and an external electrode connected to the coil portion, wherein at least a portion of the plurality of magnetic particles comprises a first layer disposed on a surface of the magnetic particles, and a second layer disposed on a surface of the first layer, wherein the first layer comprises an Fe oxide component and has a thickness of 10 nm or less, and wherein the second layer comprises an Fe—P—O-based material.

18. The coil electronic component of claim 17, wherein a thickness of the second layer is 5 to 10 times the thickness of the first layer.

19. The coil electronic component of claim 17, wherein a sum of the thicknesses of the first layer and the second layer is 50 to 100 nm.

20. The coil electronic component of claim 17, wherein the thickness of the first layer is 5 to 10 nm.

* * * * *